No. 721,284. PATENTED FEB. 24, 1903.
L. P. CALOIN.
LUBRICATOR.
APPLICATION FILED APR. 19, 1901.
NO MODEL.
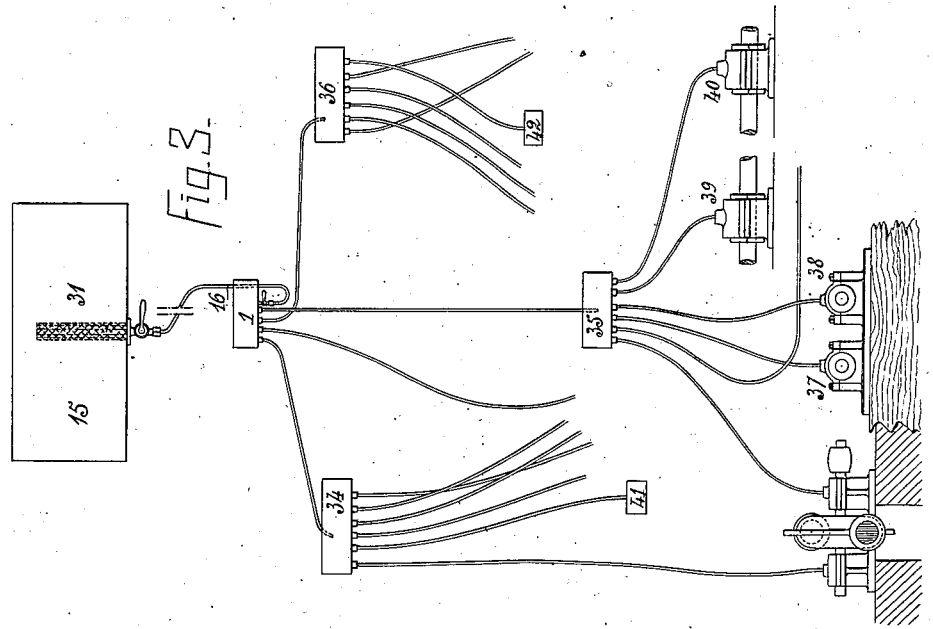
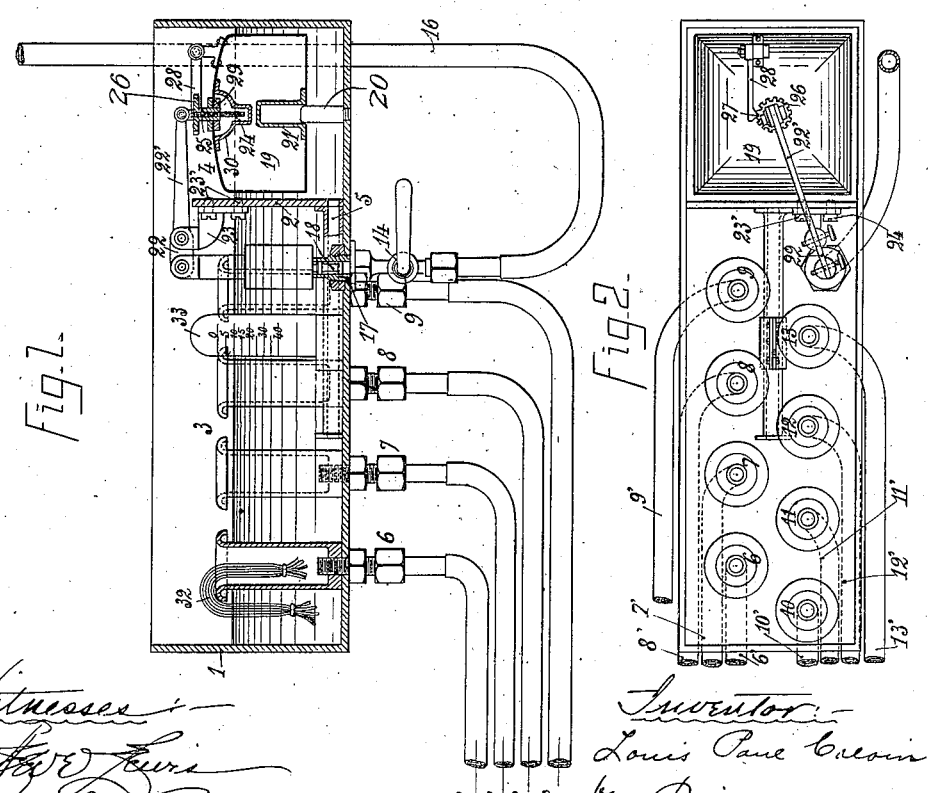

UNITED STATES PATENT OFFICE.

LOUIS PAUL CALOIN, OF DUNKERQUE, FRANCE.

LUBRICATOR.

SPECIFICATION forming part of Letters Patent No. 721,284, dated February 24, 1903.

Application filed April 19, 1901. Serial No. 56,627. (No model.)

*To all whom it may concern:*

Be it known that I, LOUIS PAUL CALOIN, of Dunkerque, France, have invented new and useful Improvements in and Connected with Lubricators, which improvements are fully set forth in the following specification.

The present invention relates to a new lubricator which allows of oil being supplied simultaneously to several oil-cups.

All the lubricators hitherto known present numerous defects, among which may be mentioned in the first place the irregularity of the lubrication, which is greater at the commencement when the lubricator has just been filled with oil and diminishes in proportion as the supply of oil is exhausted, so that in order to avoid excessive friction it is practically necessary to exceed the quantity of oil normally necessary. Moreover, these apparatus as constructed hitherto present the further drawback that when the oil is contained in open cups or burettes a considerable quantity of the oil may be wasted—for instance, in marine engines in consequence of the rolling of the ship, without mentioning the danger incurred in filling the oil-cups in bad weather, the engineer being, in fact, exposed every moment to being caught by one of the moving parts of the engine. In order to obviate this drawback, this new kind of automatic lubricator has been invented.

Referring to the accompanying drawings, Figure 1 is a longitudinal sectional view of my improved lubricator. Fig. 2 is a plan view thereof, and Fig. 3 is a diagrammatic view of a lubricating system.

The new lubricator consists, essentially, of a distributing vessel 1 of suitable size, which is divided into two unequal compartments 3 and 4 by a vertical partition 2. These two compartments only communicate with each other by means of a tube 5, the diameter of which is small enough to prevent any sudden displacement of the oil from one compartment to the other. This is of special advantage when the lubricator is fitted to the machinery of a ship. On the bottom of the larger compartment 3 are screwed any preferred number of couplings 6 7 8 9 10 11 12 13, on which are mounted an equal number of pipes. Washers of leather or other suitable substance form air-tight joints. The pipes 6, 7, 8, &c., open at the top and widened, receive wicks 32, the other ends of which are plunged in the compartment 3, kept filled with oil at a constant level, as will be described later on. These wicks 32 act by capillary attraction to carry the oil from the oil-compartment into the various pipes. These pipes supply a corresponding number of collecting-cups 34 35 36, &c., which in their turn distribute the lubricating-oil to any suitable number of oil-cups placed at all the joints of the engine. There is also fixed at the bottom of this compartment 3 a valve 18, communicating with an oil-reservoir 15 by means of a pipe 16. Said reservoir 15 may contain a sufficient quantity of oil to keep the apparatus going for a long time. The valve 18 has a seat 17, on which rests a valve-plug controlled by a float 19, which is guided in all directions by means of a square guide 20, engaging in a socket 21 of the same form, arranged in the lower part of the float 19. The valve is rendered independent of the movements of the float by means of a lever 22 22', rocking at the end of a support 23, screwed on the partition-wall 2. Pivotally depending from one end 22' of the lever is a bar 24, screw-threaded with a pitch of one millimeter, the length of which bar varies according to the size of the apparatus. A screw-threaded nut on the bar 24 rotatably engages at its lower end through an opening in the upper wall of the float and has annular disk 29, secured thereto, engaging under said wall. A toothed flange 26 at the upper end of the nut is adapted to be engaged by a tooth 27 at the end of a spring-arm 28, mounted on top of the float 19. The nut is thus held in its adjusted position. A cap 30 is secured to the under side of the top wall of the float over the end of screw-threaded bar 24.

The operation of the new lubricator is very easily understood. The oil in the reservoir 15 (which reservoir is placed at a convenient height for obtaining the necessary pressure) first runs through a strainer 31, of fine wire-gauze, for preventing the passage of foreign bodies, through the valve 18 and pipe 16 into the distributing vessel 3. From thence the oil by capillary attraction rises through the wicks 32 and reaches the various pipes 6 7 8 9, &c., leading to the oil-cups 34 35 36, &c. The bar 24 being screw-threaded to a millimeter pitch in order to keep a constant level of oil-supply at, say, twenty millimeters below the orifice of the first pipe, it is sufficient to bring the nut 25 by screwing it around against the corresponding division of the bar 24. In this manner is easily regulated the level of oil in the large compartment 3, which, as already mentioned, is in constant communication with the smaller compartment 4, of rectangular form, by means of the pipe 5, placed at the lower part of the partition-wall 2. The nut 25 serves as an axially-movable connection-piece between the float and the threaded bar 24, which is itself fixed to the end 22' of the lever. It will easily be understood that if the nut 25 be turned to the right, for instance, it will move up the threaded bar, drawing the float upward with it. The distance between the float and one end of the lever being decreased, the valve-plug 18, coupled with the other arm 22 of the lever, is thus lifted correspondingly farther off its seat 17, and when the oil reaches the large compartment 3, and consequently the smaller one 4, raising progressively the float, it will take the valve-plug a longer time to settle on its seat and stop the arrival of oil. The level of the oil in the two compartments will therefore be higher than if the nut 25 had taken a position on the threaded bar 24, which would have placed the float and the lever farther apart. The function of the smaller compartment therefore is to guide the practically imperceptible movements (when the desired level is attained) of the float acting as regulator, assuring with extreme exactness the uniform level of oil in the oil-cup. Moreover, the level of the liquid in the compartment 3 may be easily controlled by means of a graduated scale 33, supported on the bottom of the receptacle. Should for any reason the oil be supplied in larger quantities than can be taken away by the pipes, the float would be at once raised and would close the inlet-valve of the oil.

In the arrangement which is here described as preferably adapted for a steamboat, for instance, the couplings communicate through the like number of pipes with an equal number of collecting-cups, which in their turn supply the separate lubricators of the plumber-blocks or other containers. Each pipe draws up the oil by capillary attraction by means of woolen wicks or the like, the number of threads of which is in proportion to the quantity of oil that they have to deliver. If, for example, one of the collectors has six lubricating-tubes which all supply one machine and have together sixty or eighty woolen strands, it suffices to put a siphon-wick of sixty or eighty woolen strands in the corresponding pipes in order to obtain an absolutely constant level of oil.

This new kind of lubricator presents numerous advantages over those hitherto known, the chief advantages consisting in the great economy of oil which it allows while assuring a lubrication of all the parts in motion in the most convenient manner. The carrying about of oil in cans or burettes for filling isolated lubricators, which wastes a considerable amount of time and material and exposes the workmen to constant dangers, especially on board ship in bad weather, is absolutely obviated thereby. Finally it allows the amount of lubrication to be varied within wide limits, whether over all the parts of an engine or over certain parts thereof which wear more rapidly.

I claim—

1. In a lubricator, an oil-distributing vessel divided into two compartments, a long pipe or passage of small cross-section through which said compartments communicate with each other, an oil-supply pipe or passage for supplying oil to the compartments, a valve for opening and closing said oil-supply pipe, a float in one compartment for automatically opening and closing said valve for maintaining the oil at a predetermined level, a plurality of pipes or passages leading from and opening into the other compartment above the level of the oil therein and wicks dipping at one end into the oil and at the other end into the open ends of said pipes or passages respectively.

2. In a lubricator, an oil-distributing vessel divided into a large and a small compartment, a long pipe or passage of small cross-section terminating at one end at about the middle of the large compartment and through which the compartments communicate with each other, an oil-supply pipe or passage leading into the large compartment, a valve for opening and closing said oil-supply pipe, a float in the small compartment connected with the valve for automatically opening and closing the same for maintaining the oil at a predetermined level, a plurality of pipes or passages leading from and opening into the large compartment above the level of the oil therein, and wicks dipping at one end into the oil and at the other end into the open ends of said pipes or passages.

3. In a lubricator, an oil-distributing vessel divided into two communicating compartments, a pipe for supplying oil thereto, a valve for automatically opening and closing communication between said supply-pipe and vessel to maintain the oil at a predetermined level in the latter, a float in one compartment for operating said valve to maintain the oil at a predetermined level, an adjustable connection between the float and valve for varying the level at which the oil is to be maintained, a plurality of pipes or passages leading from and opening into the other compartment of said vessel above the level of the oil therein, wicks dipping at one end into the oil and at their other ends into the open ends of said pipes or passages respectively.

In testimony whereof I have signed this specification in the presence of two subscribing witnesses.

LOUIS PAUL CALOIN.

Witnesses:
J. HAUTORS,
PASTON DUGUENON.